May 21, 1968     H. G. DAVIS     3,383,769

LANCE MATRIX BAND CLAMP FOR DENTAL PURPOSES

Filed Oct. 22, 1965

INVENTOR.
HAROLD G. DAVIS
BY
*Sheridan and Ross*
ATTORNEYS

United States Patent Office 3,383,769
Patented May 21, 1968

3,383,769
LANCE MATRIX BAND CLAMP FOR
DENTAL PURPOSES
Harold G. Davis, Denver, Colo., assignor to Rocky Mountain Dental Products Co., Denver, Colo., a corporation of Colorado
Filed Oct. 22, 1965, Ser. No. 501,607
6 Claims. (Cl. 32—63)

ABSTRACT OF THE DISCLOSURE

The invention is an improvement in a dental matrix clamp for clamping the looped matrix band around a tooth, the clamp being of the type having two opposed flexibly joined clamping members folded together at a bending portion between them for receiving between them the overlapping ends of the matrix band looped around a tooth, one of the clamping members having a locking member thereon for passing through a slot in the other clamping member and through the overlapping ends to lock the assembly together, the improvement being a leg member for supporting the locking member bendably attached to an end edge of one of the clamping members, and arcuate portions formed in the clamping members adapted to be flattened after assembly of the clamp over the overlapping ends of the matrix band so as to apply additional tightening pressure on the matrix band.

---

This invention relates to a dental matrix band clamp and particularly to a matrix band tightening and securing clamp means.

In the treatment of teeth involving filling cavities, preparing inlays, and the like, the tooth being treated is prepared for the desired operation by tightly securing a thin metallic strip or matrix band, usually of steel, around the tooth. After the filling, inlay, or other operation is completed, the matrix band is removed from the treated tooth. The treatment of the tooth then is finished in conventional manner or by the use of customary means.

The tight application and clamping or securement in position of the matrix band around a tooth presents a problem. The matrix band should fit tightly around the tooth being treated so that filling or inlay material does not become lodged between the band and the tooth in an undesirable or uncontrolled manner.

Accordingly, in accordance with conventional practice, the matrix band is suitably tightened and secured in place by the use of clamping means which receives the overlapping end portions of the matrix band after it has been wrapped around the tooth and clamps the wrapped portion securely against the tooth. The clamping means employed should be compact, efficient and convenient in its application and release from the matrix band. Special tools should not be required to apply and secure the band, and the clamping means should not be intricate or costly to make.

It is a primary object of this invention to provide a matrix band tightening, securing and clamping means which does not require special tools in its use.

Another object of this invention is to provide a matrix band clamping means which is capabale of being massproduced at low cost.

It is a further object of this invention to provide a compact, efficient and convenient clamping means for use with a dental matrix band.

Additional objects of the invention will become apparent from the following description, which is given primarily for purposes of illustration, and not limitation.

Stated in general terms, the objects of the invention are attained by providing a lance matrix band clamping device which includes opposed clamping members, preferably folded in opposition from a unitary strip of metal, with the folds adapted to be slipped over the end portions of a martix band which overlap the tooth after it has been wrapped around a tooth to tighten the band. One of the clamping members is provided with a lance member arranged for bending the body portion over the other clamping member and insertion of the lance element of the member in the aligned slots of the two clamping members or folds by puncturing, or indenting, the adjacent overlapping end portions of the matrix band and protruding through aligned slots in the folds. The clamping members also are provided with opposed corrugations, ridges of curved cross-section, or arcuate portions which are, in turn, provided with forward outwardly extending lips that bear against the outside surfaces of the overlapping end portions of the matrix band at their juncture against the enveloped tooth. By flattening the corrugations intermediate the lance and the enveloped tooth, after the initial tightening and locking of the lance blade in the aligned slots, an increased degree of tightening, securing and clamping of the matrix band around the tooth to be treated is accomplished.

A more detailed description of a specific embodiment of the invention is given below with reference to the accompanying drawing, wherein.

Figure 6:
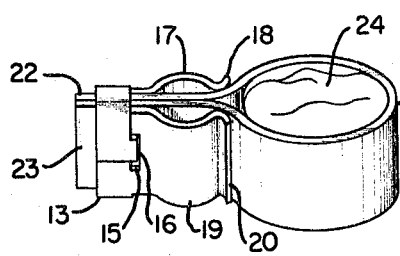
Figure 7:
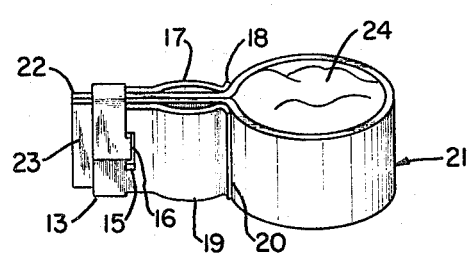

FIGURE 6 is a similar view showing the matrix band and clamp assembly mounted upon a tooth to be treated; and FIGURE 7 is a similar view showing the matrix band with the lance blade of the clamp inserted into the aligned slots of the clamp and passing through the matrix band end portions; and tightened, secured and clamped around the tooth after the corrugations have been collapsed toward each other to a controlled degree.

Figure 1:
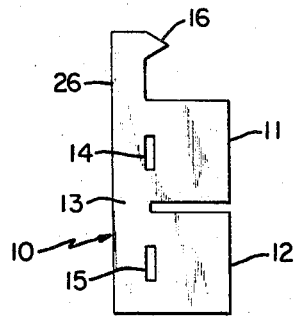
FIGURE 1 is a plan view showing a sheet metal blank of the lance matrix clamp stamped out in unitary form and provided with a lance blade and slots.
Figure 2:
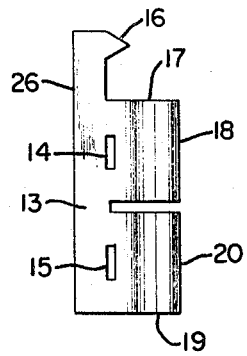
FIGURE 2 is a similar view showing the sheet metal structure of FIGURE 1 provided with corrugations and lips.

As shown in FIGURE 1, a sheet metal blank 10, of suitable material, such as brass, steel, etc., is stamped from a strip of stock sheet metal. The blank is provided with two unitary clamping portions or folds 11 and 12 jointed at 13. Clamping portions 11 and 12 are provided with slots 14 and 15, respectively, positioned for alignment as described below. The blank may be manufactured and used with a single slot only which must be in clamping portion 12. A pointed lance blade 16 and its body portion are formed integrally with clamping portion 11, as shown.

Figure 3:
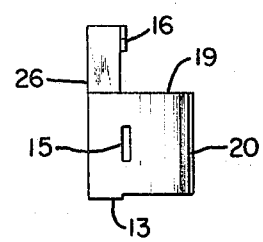
FIGURE 3 is a similar view showing the sheet metal structure of FIGURE 2 after the clamping members have been folded into opposed relationship and the lance blade has been bent inwardly at a right angle.
Figure 4:
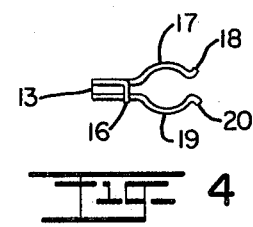
FIGURE 4 is a bottom view of the matrix clamp shown in FIGURE 3.

An outwardly curved ridge or corrugation 17 with a lip 18 is formed on clamping portion 11, and a corresponding corrugation 19 and lip 20 are formed on clamping portion 12. Next, clamping portion 12 is folded over clamping portion 11 by bending at joining portion 13, so that corrugation 19 is opposite and in opposed rather than nesting mating relationship with corrugation 17, and slots 14 and 15 are aligned, as shown in FIGURES 3 and 4. The length of the lance member is such that when it is bent over at 26 the blade will pass through aligned slots 14 and 15. Lips 18 and 20 also are aligned in opposed and spaced relationship, as shown. It is thus seen that the clamp can be mass-produced by a relatively simple stamping and folding operation.

Figure 5:
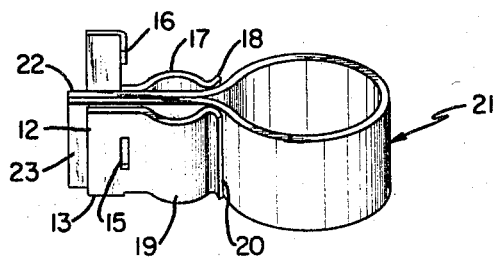
FIGURE 5 is an isometric view showing the matrix clamp of FIGURES 3 and 4 slipped over the overlapping end portions of a matrix band arranged for mounting around a tooth to be treated.

In application of the lance matrix band clamping device of the invention during the treatment of a tooth, the matrix band 21, precut to the desired lengths, is doubled upon itself with its end portions 22 and 23 in overlapping relationship, as respects the tooth, as shown in FIGURES 5 to 7. The resulting looped portion of matrix band 21 is looped around the tooth 24 to be treated, as shown in FIGURES 6 and 7, with the lance matrix clamp slidably mounted over overlapping end portions 22 and 23.

Next, the clamp is slipped and urged along overlapping end portions 22 and 23 of the matrix band 21 toward tooth 24 with the fingers, or with the aid of a suitable tool, such as a pair of pliers. The lips 18 and 20 will contact the respective outside surfaces of the end portions at their juncture against the enveloped tooth. After the clamp has been forced as far forward as possible with fingers or pliers the point of lance blade 16 is made to pass through aligned slots 14 and 15, to pierce, or indent, the overlapping adjacent end portions 22 and 23 of matrix band 21, as shown in FIGURES 6 and 7, to set or lock the lance matrix clamp in place on the overlapping end portions so that it locks the matrix band tightly and securely around the tooth. To insure secure locking the protruding portion of the blade can be bent over or clinched. When a single slot only is used in clamping member 12, the lance blade passes through this slot and the adjacent overlapping end portions 23 and 24 to be clinched against the inside surface of clamping member 11.

If it becomes necessary to further tighten the matrix band 21, the following procedure is used.

With the aid of a pair of pliers, opposed corrugations 17 and 19 are clinched, or squeezed toward each other, to progressively, or partially, flatten them, as shown in FIGURE 7, and thus bring additional controlled tightening pressure without abruptness or severity, to bear upon the loop closing portions of matrix band 21, adjacent tooth 24, through lips 18 and 20. Lips 18 and 20 are somewhat flared to avoid a binding, or scissors, action against matrix band 21. The degree and extent of flattening of corrugated portions 17 and 19 is controlled to achieve the desired degree of tightness and securement of matrix band 21 around tooth 24, so that material cannot lodge between the band and the tooth during the treatment of the tooth by filling, inlay, etc.

After the treatment of tooth 24 is completed, the clamping means of the invention can be removed in any manner desirable and the treatment of the tooth is finished in accordance with customary dental practice.

It will be understood that the matrix band clamping means of the invention can be made by the use of various manufacturing methods or techniques and in various shapes, structures or designs. Also, the location of the lance blade can be varied and the characteristics of the arcuate portions or corrugations of the clamp means can be varied, as will occur to those skilled in the art. Obviously, many modifications and variations of the construction, design, structure or function of the matrix band clamping means of the invention are possible in the light of the teachings given hereinabove. It is, therefore, to be understood that, within the scope of the appended claims, the invention can be practiced otherwise than as specifically described in connection with the appended drawing of a specific embodiment thereof.

What is claimed is:

1. A dental matrix band clamping device comprising opposed clamping members joined by a joining portion and adapted to be separated for sliding over overlapping end portions of a looped matrix band looped for fitting over a tooth to be treated, at least one of said clamping members having a locking slot therein, a leg extending from the end edge of one of said clamping members and bendably attached thereto, a locking member bendably mounted on said leg, and a slot formed in at least the other of said clamping members to receive the locking member when said clamping members are folded together at said joining portion and permit said locking member to penetrate over-lapping end portions of a looped matrix band passing between the clamping members to lock said end portions against movement relative to the clamping device.

2. A dental matrix band clamping device comprising joined opposed clamping members adapted to be separated for sliding over overlapping end portions of a matrix band looped over a tooth to be treated, an arcuate portion formed on the forward end of each of the clamping members adapted to be flattened so as to apply additional tightening pressure on said matrix band, a lip portion formed on each of the clamping members forward of said arcuate portion for sliding engagement of respective outside surfaces of overlapping end portions of a matrix band disposed between the clamping members, a pointed member pivotally mounted on one of the clamping members, and aligned slots formed in the clamping members for receiving the pointed member and permitting it to penetrate said overlapping end portions to lock them against movement relative to the clamping device.

3. A dental matrix band clamping device comprising a pair of joined opposed clamping members adapted to be separated for sliding over overlapping ends of a matrix band looped over a tooth to be treated, an arcuate portion formed in at least one of said clamping members and adapted to be flattened so as to apply additional pressure on said matrix band, a lip portion formed on the forward end of each of the clamping members for sliding engagement of respective outside surfaces of overlapping end portions of a matrix band disposed between the clamping members, a pointed member bendably mounted on one of the clamping members, and a slot formed through at least the other of said clamping members for receiving the pointed member and permitting it to penetrate said overlapping end portions in locking engagement.

4. A dental matrix band clamping device comprising a pair of opposed clamping members formed in a unitary sheet of metal and adapted to be separated for sliding over overlapping end portions of a matrix band looped over a tooth to be treated, an opposed corrugation formed on each of the clamping members and adapted to be flattened so as to apply additional pressure on said matrix band, an opposed lip portion formed on each of the clamping members forward of the corrugation for sliding engagement of respective outside surfaces of overlapping end portions of a matrix band disposed between the clamping members, a pointed lance member bendably mounted of unitary sheet metal on one of the clamping members, and aligned slots formed through the clamping members for receiving the pointed lance member and permitting it to penetrate said overlapping end portions in locking engagement.

5. A clamping device for locking at least one element therein comprising: a pair of clamping members flexibly joined together by a joining portion and forming a receiving slot therebetween for receiving said element when folded together at said joining portion, at least one of said clamping members having a locking slot therein, a leg extending from the end edge of one of said clamping members and bendably attached thereto; a locking member bendably attached to said leg and adapted to pass through at least the other of said clamping members and through an element positioned between said clamping members when said clamping members are folded together at said joining portion, to lock said element against relative movement with respect to said device.

6. In a dental matrix band clamping device comprising joined opposed clamping members adapted to be separated for sliding over overlapping ends of a matrix band looped over a tooth to be treated and provided with means for locking together said overlapping ends and at least one of said clamping members, the improvement which comprises an arcuate portion formed on at least one of said clamping members adapted to be flattened so as to apply additional pressure on said matrix band.

References Cited

UNITED STATES PATENTS

| 983,844 | 2/1911 | Shannon | 32—63 |
| 2,575,800 | 11/1951 | Eicher | 32—63 |
| 3,046,659 | 7/1962 | Tofflemire | 32—63 |

LOUIS G. MANCENE, *Primary Examiner.*

C. R. WENTZEL, *Assistant Examiner.*